(12) United States Patent
Lavigne et al.

(10) Patent No.: US 7,103,045 B2
(45) Date of Patent: Sep. 5, 2006

(54) SYSTEM AND METHOD FOR FORWARDING PACKETS

(75) Inventors: Bruce E. Lavigne, Roseville, CA (US); Lewis S. Kootstra, Roseville, CA (US); Mark Gooch, Citrus Heights, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 959 days.

(21) Appl. No.: 10/091,691

(22) Filed: Mar. 5, 2002

(65) Prior Publication Data

US 2003/0169736 A1 Sep. 11, 2003

(51) Int. Cl.
*H04L 12/56* (2006.01)
*G06F 9/34* (2006.01)
*G06F 12/02* (2006.01)
*G06F 12/10* (2006.01)

(52) U.S. Cl. .................. 370/392; 370/400; 711/206; 711/216

(58) Field of Classification Search ................ 370/389, 370/392, 400; 711/202, 206, 216
See application file for complete search history.

(56) References Cited

U.S. PATENT DOCUMENTS 6,266,705 B1 * 7/2001 Ullum et al. ................ 709/238

* cited by examiner

*Primary Examiner*—Chi Pham
*Assistant Examiner*—Ronald Abelson

(57) ABSTRACT

A system for forwarding packets. The system has a first node for creating requests that contain a number of filters for specifying packet forwarding criteria. The first node also specifies values for the filters based on a packet to be forwarded. The system also has a second node coupled to the first node and to a number of ports. The second node has at least one table for specifying which of the ports are to receive the packet based on the filter values. The second node determines which of the ports are to receive the packet based on the table information and the filter values.

25 Claims, 16 Drawing Sheets

420

| Command | Value |
|---|---|
| Buffer Request A | 0x0 |
| Buffer Request B | 0x1 |
| Buffer Reply | 0x2 |
| Send | 0x8 |
| Sendm | 0x9 |
| Credit | 0xC |
| Sync | 0xF |

| res # | filtered | X | src_chip | src_tag | dst_chip |
|---|---|---|---|---|---|
| 721 | 722 |  | 724 | 725 | 726 |

Fig. 7B

| Status | Value | Meaning |
|---|---|---|
| NACK | 2'b00 | No buffer was reserved. Another buffer request should be retired after waiting the period indicated by the nak_dly field:<br><br>00 ==> no delay<br>01 ==> Unit_Delay<br>10 ==> 2*Unit_Delay<br>11 ==> 4*Unit_Delay<br><br>Each requester maintains its own definition of what a Unit_Delay is. At a minimum, the following Unit_Delay values should be available:<br><br>-0.5uS (64 system clocks)<br>-1.0uS (128 system clocks)<br>-2.0uS (256 system clocks)<br>-4.0uS (512 system clocks)<br><br>Note that two_dly fields are supplied. The nak_dly field should be used for situations that are NOT speculative. The snak_dly field should be used for speculative situations. Note that a request can transition from speculative to non-speculative (not head-of-line to head-of-line) while the reply is in flight.<br><br>These fields should be ignored if the reply is not NACK. |
| DROP | 2'b01 | No buffer was reserved, the packet should be dropped. |
| PARTIAL ACK | 2'b10 | A buffer was reserved and the packet should be forwarded. Some of the requested output ports will discard the packet due to resource limitations. This response may only occur if the request had its BEA (best effort acceptable) bit set. |
| FULL ACK | 2'b11 | A buffer was reserved and the packet should be forwarded. All requested output ports will accept the packet. |

| Type | Value | Meaning |
|---|---|---|
| Normal | 2'b00 | Normal Header, data immediately follows the send command. |
| Extended | 2'b01 | Extended Header #1, 3 144 bit words follow the header, then data begins |
| Reserved | 2'b1X | Reserved for future use. |

Fig. 9

SYSTEM AND METHOD FOR FORWARDING PACKETS

TECHNICAL FIELD

The present invention relates to the field of networking. Specifically, the present invention relates to a system and method for forwarding packets.

BACKGROUND ART

Hubs, switches, routers and the like provide necessary infrastructure for networking computers and other electronic devices. These devices allow great flexibility in constructing networks by choosing the type of device along with its characteristics, such as the port support it provides. For example, one chip in the device may have 16 ports that operate at 10/100 Mb/s and another chip may have 4 ports that operate at 1 Gb/sec. The number of chips in the device may be expandable, thus providing for a flexible device. However, this complicates the forwarding process. Importantly, while these devices are performing their function of forwarding packets to selected ports such that packets are delivered to appropriate nodes in the network, the forwarding decision must be made rapidly so as to not impede performance. Also, the forwarding decision is complicated by the variety of configurations and features that the device itself may support.

For example, the forwarding process is complicated by the variety of architectures that may be supported. One conventional method requires each chip itself to determine which ports should receive the packet(s). Unfortunately, this requires each chip to support the maximum number of ports that the architecture will ever contain. Consequently, this requires substantial overhead and has little flexibility and poor scalability.

Additionally, the forwarding process may impair device throughput. Another conventional method of forwarding packets is to send all packets to a centralized decision point in the device to determine which ports should receive the packet(s). Unfortunately, this has severe bandwidth limitations because every packet must be processed by a single entity in the device.

Therefore, conventional methods have problems being both efficient and flexible when forwarding packets to selected ports. Conventional methods have difficulty providing a forwarding solution in a flexible architecture that allows for a variable number of cards, each card with a variable number of ports.

DISCLOSURE OF THE INVENTION

The present invention pertains to a system for forwarding packets. The system has a first node for creating requests that contain a number of filters for specifying packet forwarding criteria. The first node also specifies values for the filters based on a packet to be forwarded. The system also has a second node coupled to the first node and to a number of ports. The second node has at least one table for specifying which of the ports are to receive the packet based on the filter values. The second node determines which of the ports are to receive the packet based on the table information and the filter values.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4B illustrates exemplary command types, in accordance with embodiments of the present invention.

FIG. 7A and FIG. 7B illustrate an exemplary buffer reply command, in accordance with embodiments of the present invention.

FIG. 7C illustrates an exemplary buffer reply status for a buffer reply command, in accordance with embodiments of the present invention.

FIG. 9 illustrates exemplary header types, in accordance with embodiments of the present invention.

BEST MODE FOR CARRYING OUT THE INVENTION

Embodiments of the present invention provide a system and method for forwarding packets to selected ports of a device. Embodiments of the present invention provide for such a system and method that allows efficient forwarding in a flexible architecture allowing for a variable number of cards, each card with a variable number of ports.

In one embodiment, a system has a first node that creates a request for buffer space when it has a packet that is to be forwarded on one or more ports. The request is sent to a second node and contains a number of filters for specifying packet forwarding criteria. The first node also specifies values for the filters based on the packet to be forwarded. The second node has a number of ports and is coupled to memory in which the first node is requesting space for the packet. The second node has tables that specify which of the ports are to receive the packet based on the filter values. The second node determines which of the ports are to receive the packet based on the table information and the filter values.

Figure 1:
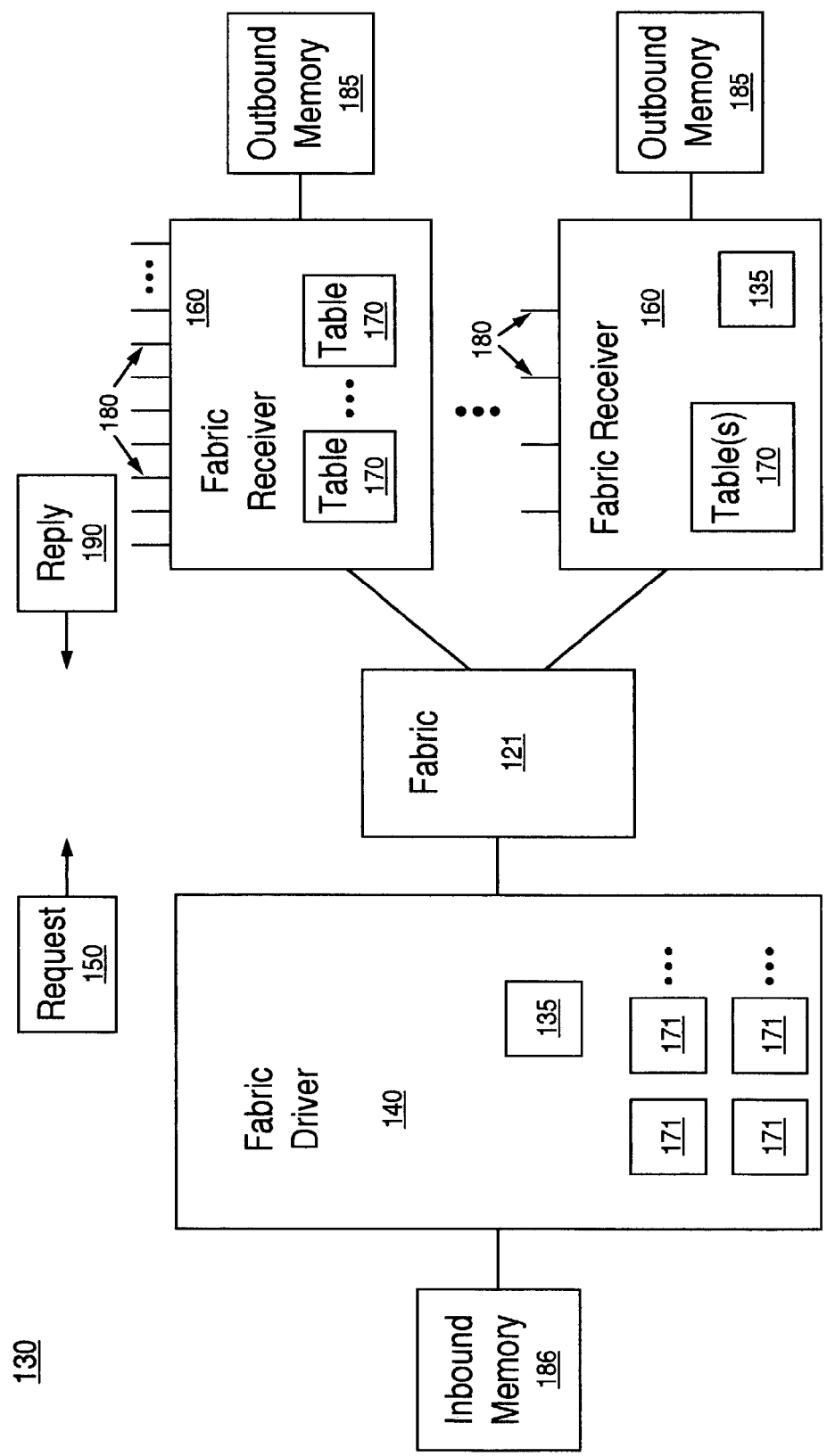
FIG. 1 is a block diagram illustrating a system for forwarding packets, in accordance with embodiments of the present invention.

Referring now to FIG. 1, an embodiment of the present invention provides for a system 130 for forwarding packets. The system 130 has a first node 140 or first logical unit 140, for example, a fabric driver 140 for creating buffer requests 150 having a number of filters for specifying packet forwarding criteria and for specifying values for the filters based on a packet or transmission to be forwarded. Upon receiving a packet at inbound memory 186 to be forwarded on one or more ports 180, the fabric driver 140 creates the buffer request 150 to reserve space in the outbound memory 185.

The filter indices in the buffer request 150 may be determined by the fabric driver 140 or by other logic (not shown). The filters may provide a way to limit which ports 180 receive the packet, without necessarily specifying the port(s) 180 in the buffer request 150. For example, the filter indices may define which ports 180 are to receive the packets based on criteria, such as, for example, Virtual Local Area Network (VLAN) membership, multicast group membership, trunk forwarding information, etc. The present invention is not limited to the filter indices described herein and is well suited to developing additional filter indices for various parameters that may affect forwarding decisions, such as, for example, hardware, protocol, etc.

By using filter indices to specify forwarding criteria, the fabric driver 140 need not explicitly specify or even know the ports 180 that are to receive the packet(s). For example, the fabric driver 140 need not know which ports 180 are on a VLAN, only that whatever ports 180 are on the VLAN are to receive packet(s). However, the fabric driver 140 may specify the ports 180. For example, the fabric driver 140 may effectively single out a port 180 by sending a filter with an index of 'unicast mode' or other criteria. Thus, the fabric driver 140 may send a buffer request 150 without factoring in the number of ports 180 at the fabric receivers 160.

The system 130 also has one or more fabric receivers 160, which may be coupled to the fabric driver 140 via a fabric 121 and which may have at least one table 170 comprising port masks. The fabric receivers 160 may be for determining which ports 180 are to receive the packet based on the filter values in the buffer request 150 and information in the table(s) 170. The system 130 allows for the number of fabric receivers 160 to be changed on the fly without the fabric driver 140 needing to know about all the ports 180 on the receiver side. Furthermore, not all fabric receivers 160 need have the same numbers of ports 180 and the ports 180 may have different characteristics. For example, one fabric receiver 160 may support twenty-four ports 180 capable of a 10/100 Mb/sec transmission rate. Another fabric receiver 160 may supports four ports 180, each capable of a 1 Gb/sec transmission rate. By allowing for a small or large number of fabric receivers 180 and for each fabric receiver 160 to have a large or small number of ports 180 (and with varying characteristics), embodiments of the present invention provide for a flexible system 130 that efficiently forwards packets. The fabric driver 140 may continue to send buffer requests 150 without any modification to it even if there are configuration changes to the fabric receiver side.

While the fabric driver 140 and fabric receivers 160 are illustrated in FIG. 1 as separate blocks, they may be on the same physical component. Furthermore, a general purpose processor 135 may be coupled to or within the fabric driver 140 and another general purpose processor 135 may be coupled to or within the fabric receiver(s) 160. Embodiments of the present invention are implemented in hardware, for example, as one or more application specific integrated circuits (ASICs).

Figure 2:
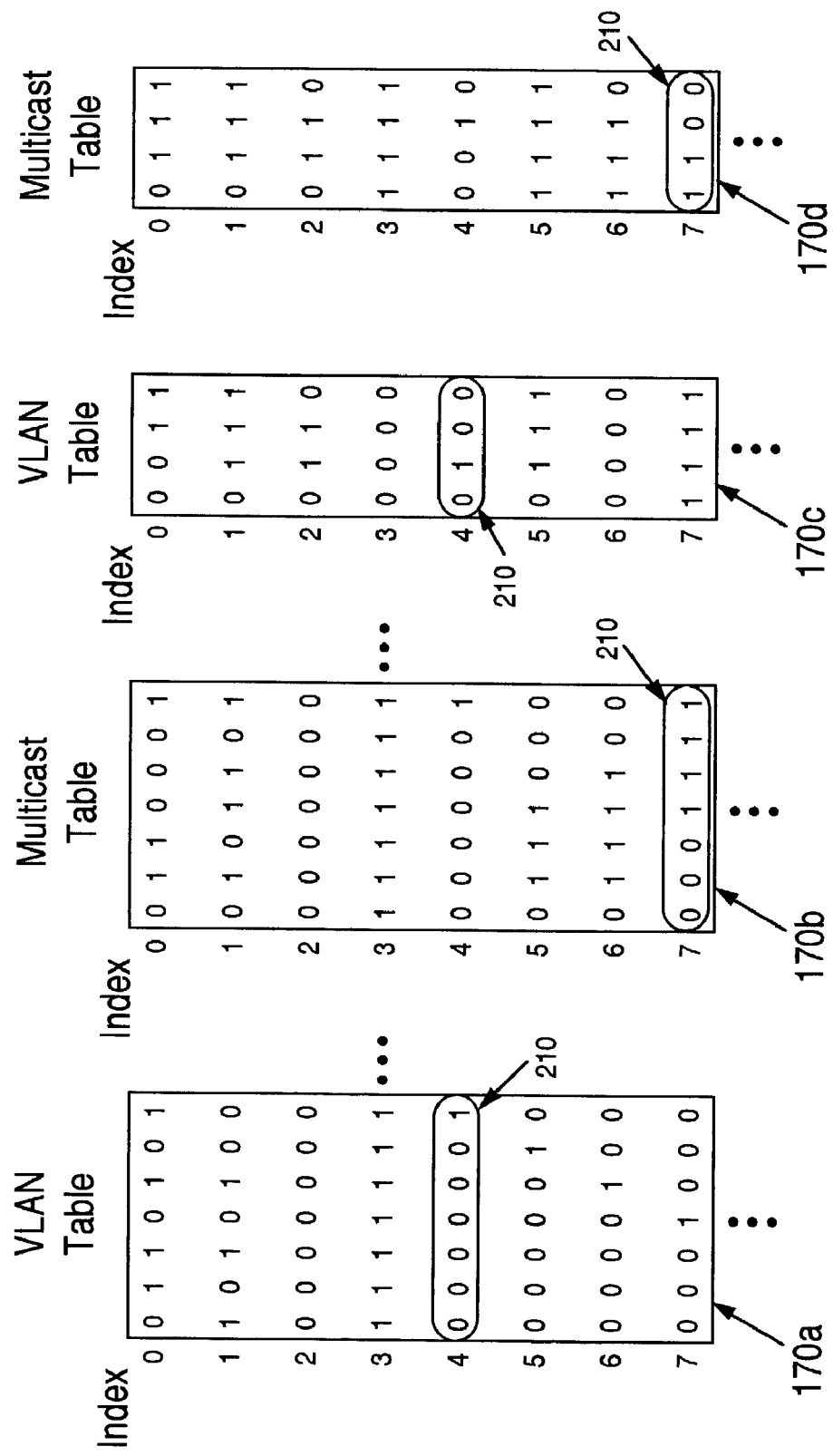
FIG. 2 is a diagram of a table of exemplary bit masks, in accordance with embodiments of the present invention.

Referring now to FIG. 2, the fabric receivers 160 may have a table 170 for each filter in the buffer request 150, although a table 170 may be used for more than one filter. FIG. 2 shows tables 170 for VLAN and multicast for two fabric receivers 160. Each table 170 may contain a port mask (or bit mask) 210 for each filter index. Each port mask 210 may have a bit for each port 180 which the particular fabric receiver 160 supports. Having a bit set may mean that the corresponding port 180 should receive a packet for the criteria specified by the filter index. For example, if the filter index is VLAN membership, a bit in the bit mask 210 is set corresponding to each port 180 that is a member of the VLAN. Tables 170*c* and 170*d* of FIG. 2, have four bit port masks 210 and may be suitable for the lower fabric receiver 160 in FIG. 1, as it is shown having four ports 180. Tables 170*a* and 170*b* of FIG. 2 show the first seven bits of port masks 210. If, for example, there are 24 ports 180 on the fabric receiver, there may be a 24 bit port mask 210 in the tables 170*a* and 170*b*.

Still referring to FIG. 2, an example using two filter indices may function as follows. The fabric driver 140 creates a buffer request 150 containing a filter for 'VLAN' and one for 'multicast'. The buffer request 150 may contain an index for each filter, for example, VLAN=4 and multicast=7. After receiving the buffer request 150, the fabric receiver 160 indexes a table 170 and may perform a logical AND of index results. For example, indexing table 170*a* with a VLAN index of 4 produces a bit mask 210 of "0000001" for the first seven bits. Indexing table 170*b* with a multicast index of 4 produce a bit mask 210 of "0001111" for the first seven bits. Performing a logical AND of these two bit masks 210 produces a values of "0000001", indicating that the seventh port from the left should receive the packet. Referring to tables 170*c* and 170*d*, indexing those tables 170 in a similar fashion produces bit masks 210 of "0100" and "1100" Performing a logical AND of these values indicates that only the second port 180 from the left should receive the packet.

Embodiments of the present invention may have many more tables 170 for other filters and may perform a logical AND of the result of indexing all such tables 170. Thus, the number of ports 180 to receive the packet may be limited to any suitable degree by selection of filters. Embodiments may use the same table 170 for more than one filter. Furthermore, embodiments are not limited to combining the result of indexing the table by performing a logical AND.

Referring again to FIG. 1, after the fabric receiver 160 determines which ports 180 should receive the packet(s), it determines whether sufficient memory is free in the outbound memory 185. Each port 180 may have, for example, a portion of the outbound memory 185 reserved for its use, although this is not required.

The fabric receiver 160 then generates a buffer reply 190, which may indicate whether the fabric driver 140 should send the packet(s) now, wait and retry the buffer request 150, or drop the packet(s) because, for example, no port 180 coupled to the fabric receiver 160 is to receive the packet(s).

Still referring to FIG. 1, the fabric driver 140 may have one or more tables 171 containing information for specifying which of the fabric receiver(s) 160 are to receive the buffer request command 150 based on the filter indices. The fabric driver 140 may index these table(s) 171 with the filter indices and may perform a logical AND of the index results to determine which fabric receiver(s) 160 are to receive the buffer request command(s) 150. In this fashion, the fabric driver 140 may be able to limit to which fabric receivers 160 it sends buffer request commands 160.

Figure 3:
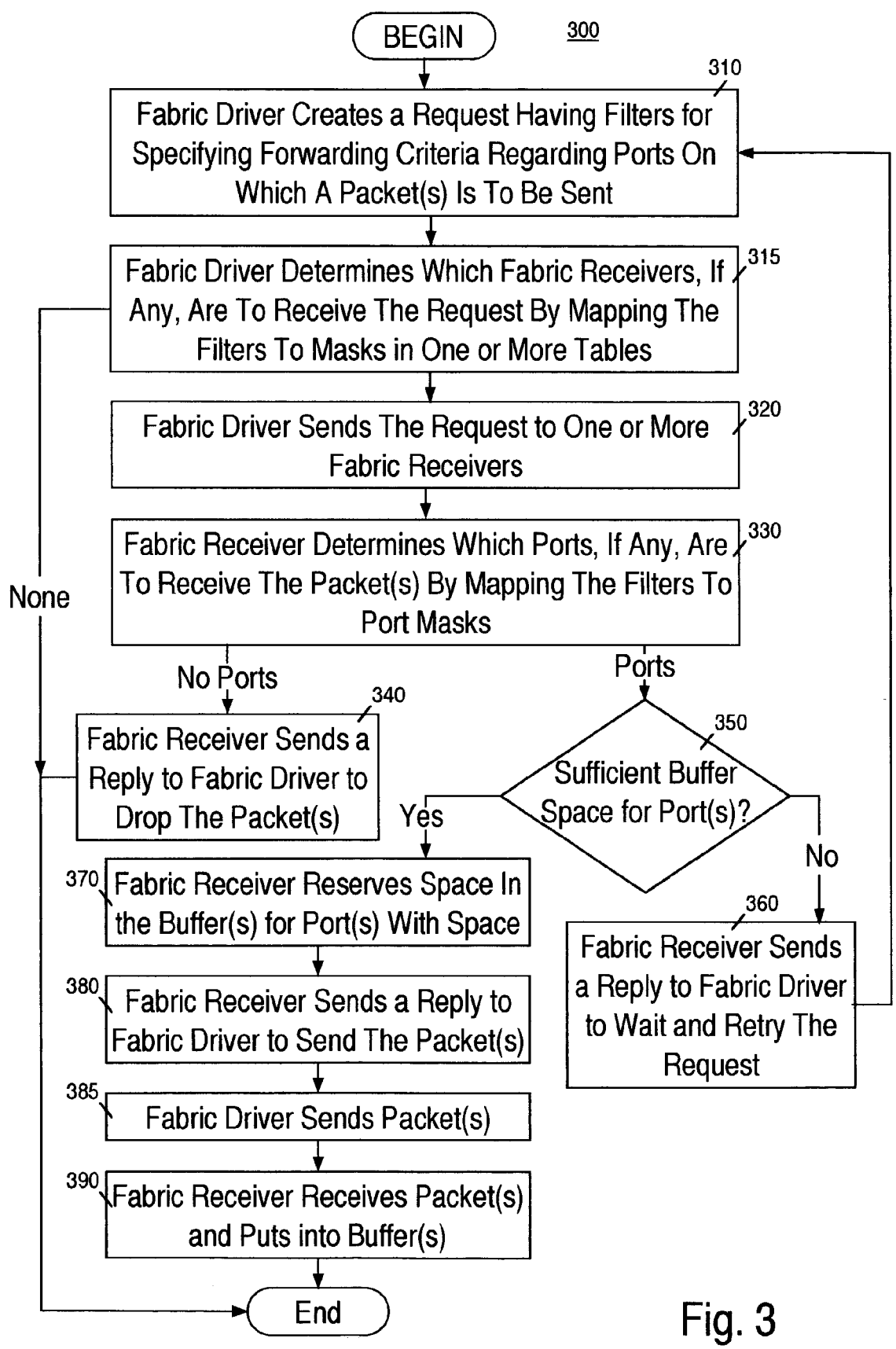
FIG. 3 illustrates a flowchart showing steps of a process of forwarding packets, in accordance with embodiments of the present invention.

Referring now to FIG. 3, an embodiment providing for a method of forwarding packets will be described. Steps of Process 300 of FIG. 3 may be executed as instructions stored on computer readable medium(s). Some steps may be executed by a general purpose processor 135 coupled to or within the fabric driver 140 and other steps may be executed by a general purpose processor 135 coupled to or within the fabric receiver(s) 160. In one embodiment, the steps are executed in hardware, for example, via an ASIC.

In step 310, the fabric driver 140 creates a buffer request 150 having a number of filters for specifying forwarding criteria for a packet or packets. As a part of step 310, the fabric driver 140 may examine an incoming packet to determine the filter indices. The filters may be based on criteria, such as, for example, VLAN membership, packet source port, trunk balancing, multicasting, unicasting, and protocols supported.

In step 315, the fabric driver 140 determines which fabric receivers 160, if any, are to receive the buffer request 150 by mapping the filters to masks in one or more tables 171. For example, the fabric driver 140 indexes at least one table 171 with the filter indices and then performs a logical AND of the results. The result may indicate that no fabric receiver is to receive the buffer request 150 because, for example, no port 180 is to receive the packet, based on the filter indices. In this case, the process 300 may end.

In step 320, the fabric driver 140 sends the buffer request 150 to one or more fabric receivers 160 through a fabric 121. The fabric driver 140 may send multiple buffer requests 150 to fabric receivers 160, wherein they forward packets to ports 180 coupled to those fabric receivers 160. However, embodiments may provide for a single buffer request command 150 being forwarded on to multiple fabric receivers 160 by, for example, the fabric 121. The fabric driver 140 may be referred to as a first logical unit and the fabric receiver 160 as a second logical unit. For clarity, steps 320–390 will be discussed will respect to the processing done at a single fabric receiver 160. However, these steps may be undertaken by multiple fabric receivers 160, essentially simultaneously, in the event buffer request commands 150 are sent to multiple fabric receivers 160.

In step 330, the fabric receiver 160 determines which ports 180, if any, are to receive the packet(s) by mapping the filters in the buffer request 150 to port masks 210 stored in tables 170. This step may comprise indexing tables 170 with the filter indices to determine bit masks 210 and combining the bit masks 210 to determine the ports 180 that are to receive the packet(s). For example, the port masks 210 may be combined by performing a logical AND between the bit masks 210. The fabric receivers 160 may perform this step in parallel and independent of each other in the case that multiple fabric receivers are processing buffer request commands 150.

If no port 180 is to receive a packet, the fabric receiver 160 formulates a buffer reply 190 and sends it through the fabric 121 to the fabric driver 140, in step 340. Upon receiving this reply, the fabric driver 140 may drop the packet(s) and the process 300 may end.

On the other hand, if the fabric receiver 160 determine that at least one port 180 is to receive a packet or packets, then the fabric receiver 160 determines, in step 350, if there is sufficient memory in the outbound memory 185 for the port(s) 180 to receive the packet at this time. The decision may be based on whether all ports 180 coupled to a given fabric receiver 160 are ready or whether at least one port 180 is ready.

If there is not sufficient memory in the outbound memory 185, the fabric receiver 160 formulates a buffer reply 190 that specifies that the fabric driver 140 should wait a period of time and retry the buffer request 150, in 360. This insufficient memory reply may be sent even if some ports 180 have sufficient room for the packet. For example, if other ports 180 do not have room and an "all-or-nothing" flag was set in the buffer request 150, then the fabric receiver 160 may formulate a buffer reply 190 for wait and retry. After step 360, the process 300 may repeat by the fabric driver 140 waiting a specified period of time and re-sending the buffer request 150.

If there is sufficient memory in the outbound memory 185, the fabric receiver 160 reserves the space and keeps track of a reservation number and the space reserved in outbound memory 185 for this buffer request 150, in step 370.

Continuing on with the case of sufficient space, the fabric receiver 160 formulates and sends a buffer reply 190 that specifies that the fabric driver 140 should send the packet(s), in step 380. If the buffer request 150 specifies that not all ports 180 need to be ready to receive, the buffer reply 190 may indicate that at least one port 180 has enough memory associated with it. On the other hand, if the buffer request specified "all-or-nothing", then this buffer reply 190 may indicate that all ports 180 to receive the packet(s) have sufficient associated memory.

In step 385, the fabric driver 140 sends the packet(s) to the fabric receiver 160. The fabric driver 140 may also send associated information that specifies the reservation number.

In step 390, the fabric receiver 160 receives the packet(s) and associated information that specifies the reservation number. Using the reservation number and the information it saved in step 370, the fabric receiver 160 may transfer the packet(s) into the outbound memory 185. The process 300 may then end.

Figure 4A:
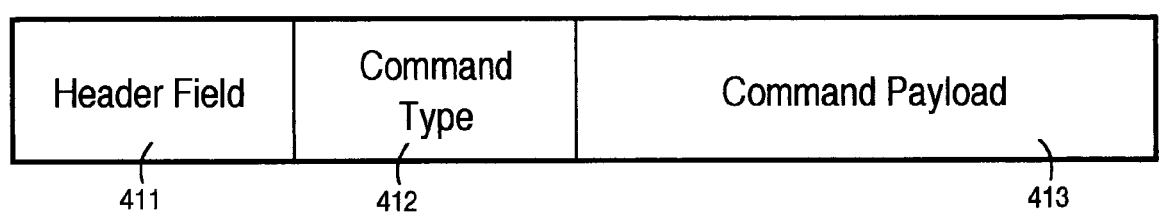
FIG. 4A illustrates an exemplary command frame, in accordance with embodiments of the present invention.

Referring now the FIG. 4A, an exemplary command frame 410 that may be used in the exchange between the fabric driver 140 and fabric receiver(s) 160 is shown. The exemplary command frame 410 has fields for a header 411, command types 412 and command payload 413. FIG. 4B illustrates exemplary command types 420, some of which are shown in further detail in other Figures.

Figure 5A:
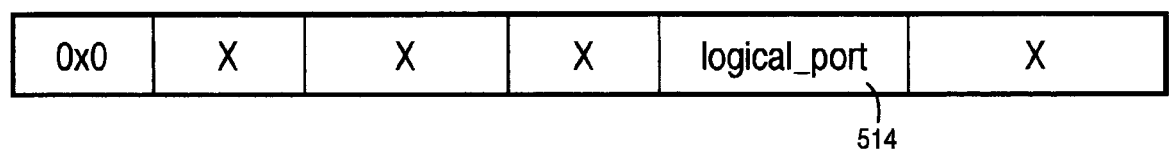
FIG. 5A and FIG. 5B illustrate an exemplary buffer request command, in accordance with embodiments of the present invention.
Figure 5B:
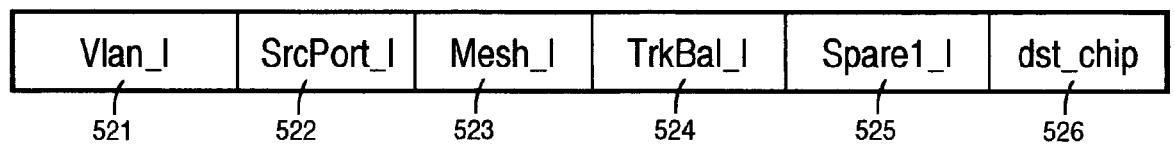

FIGS. 5A, 5B, 6A and 6B illustrate exemplary buffer request 150 commands. FIGS. 5A and 5B form one buffer request command 150 and FIGS. 6A and 6B form a second buffer request command 150. In the embodiments shown in FIGS. 5A–6B, the two buffer request commands 150 may both be sent in a part of a single exchange. However, the present invention is not limited to using two buffer request commands 150 per exchange. For example, the format of the buffer request command 150 may allow all information to be passed in a single buffer request command 150.

Referring now to FIG. 5A, half of the first buffer request 150 command has a logical_port field 514 which may be for logical port number and may allow certain traffic to be stopped, for example, if the source equals the destination. The exemplary commands and fields may be of any suitable length.

Referring now to FIG. 5B, which illustrates the second half of the buffer request command 150 of FIG. 5A, the Vlan_I field 521 may be for specifying a VLAN filter index. This and other filter indexes are used by the fabric receiver 160 to index a table of bit masks 210. The SrcPort_I field 522 may be to specify a source port index, defining the source port from which the packet originated. The Mesh_I field 523 may be used to specify a mesh index and may be used as a part of a load balancing forwarding process. The TrkBal_I field 524 may be used to specify a trunk balancing index and may be used, for example, to load balance between multiple links connecting two nodes. The Spare_I field 525 may be an unused field reserved for a future index. The dst_chip field 526 may be for specifying the destination fabric receiver 160 for this buffer request 150. The fabric 121 may use this field when routing the buffer request 150.

Figure 6A:
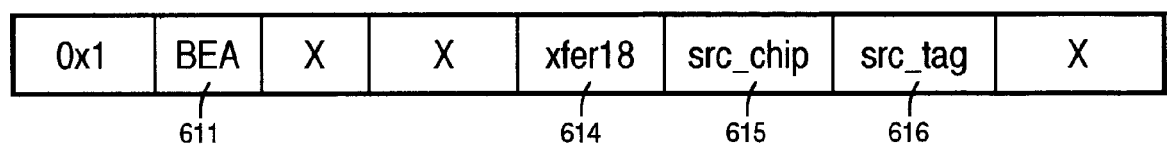
FIG. 6A and FIG. 6B illustrate another exemplary buffer request command, in accordance with embodiments of the present invention.
Figure 6B:
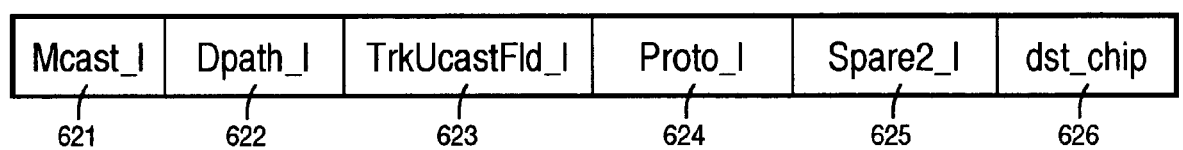

Referring now to the exemplary buffer request command 150 of FIG. 6A and FIG. 6B, the BEA field 611 in the half of the buffer request command 150 in FIG. 6A may be for indicating that best efforts are acceptable. For example, to accept the buffer request 150, the fabric receiver 160 need only find a single port 180 with available buffer space in the outbound memory 185. If this bit is cleared it may indicate that all ports 180 that are to receive the packet(s) must have free buffer space.

Continuing with FIG. 6A the xfer18 field 614 may be for indicating the number of 18 byte transfers necessary for the packet. The src_chip field 615 may be for identifying the chip (e.g., fabric driver 140) from which the request is originating and may be used to route the buffer reply 190. The src_tag field 616 may specify information that is echoed back in the buffer reply 190 to associate the buffer reply 190 with the buffer request 150.

Referring now to FIG. 6B, the second half of the buffer request command 150 illustrated in FIG. 6A will be discussed. The Mcast_I field 621 may be for specifying a multicast index, which is used by the fabric receiver 160 to index a table 170 of bit masks 210 to determined which ports 180 are to receive the multicast. The Dpath field 622 may be for a filter index and may specify data path information that may be related to protocols, for example. The TrkUcastFld_I field 623 may be for a TrunklUnicast/Flood filter index and may be used in specifying the destination logical port(s) for unicast packet(s). The Proto_I field 624 may be for a prototype filter index and may be for identifying protocols, for example. The Spare2_I field 625 may be reserved for a future filter index. Finally, the dst_chip field 626 may be identical to the dst_chip information from the exemplary buffer request command 150 in FIG. 5B.

Figure 7A:
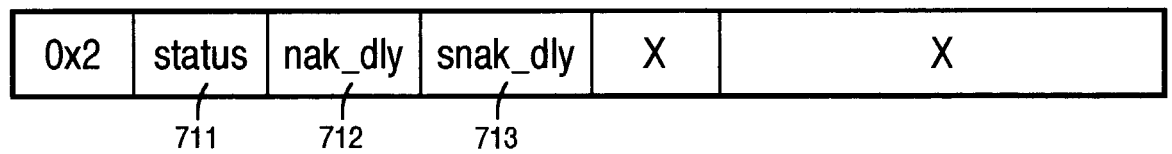

Referring now to FIG. 7A and FIG. 7B an exemplary buffer reply command 190 will be discussed. The status table 750 of FIG. 7C will be referred to when discussing the status of the buffer reply command 190. As discussed herein, the fabric receiver 160 may indicate that the packet should be sent now, later, or dropped. If the packet is to be sent later, the fabric receiver sets the status field 711 to the value for NACK (e.g., "00"). The value in the nak_dly field 712 and the snak_dly field 713 specify the length of delay. For example, referring to FIG. 7C, various time periods are specified. Embodiments of the present invention are well suited to defining whatever time delays are convenient and appropriate.

Still referring to FIG. 7C, if the packet is to be dropped, the status field 711 may be set to "01" to indicate no buffer space was reserved in outbound memory 185. If the packet is to be transferred, the status field 711 maybe set to partial ACK or full ACK, as illustrated in FIG. 7C.

Referring now to FIG. 7B, which continues the buffer reply command 190 of FIG. 7A, the res # field 721 may contain a reservation number (e.g., an address of an element in a reservation table to specify the outbound memory 185 space that is reserved for this packet). The filtered field 722 may indicate that no port 180 is to receive the packet because the filter operation removed all ports as candidates for the packet. The src_chip field 724 may specify the fabric receiver 160 that is sending the buffer reply command 190. This field may be used by the fabric driver 140 to distinguish between fabric receivers 160, as the same src_tag field 725 (see also, e.g., FIG. 6A, 616) may be associated with buffer request commands 150 to different fabric receivers 160. The src_tag field 725 may correspond to the same field (e.g., FIG. 6A, 616) of the buffer request command 150. The dst_chip 726 field may specify the fabric driver 140 that is to receive this buffer reply command 160.

Figure 8A:
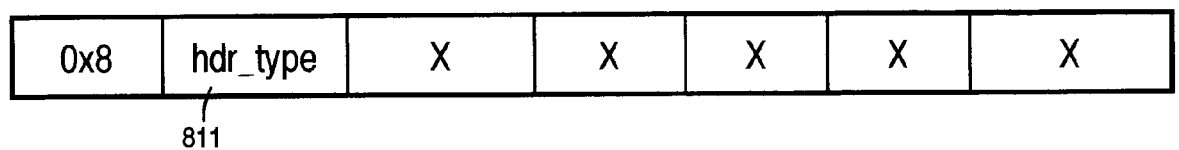
FIG. 8A, FIG. 8B, and FIG. 8C illustrate an exemplary send command, in accordance with embodiments of the present invention.
Figure 8B:
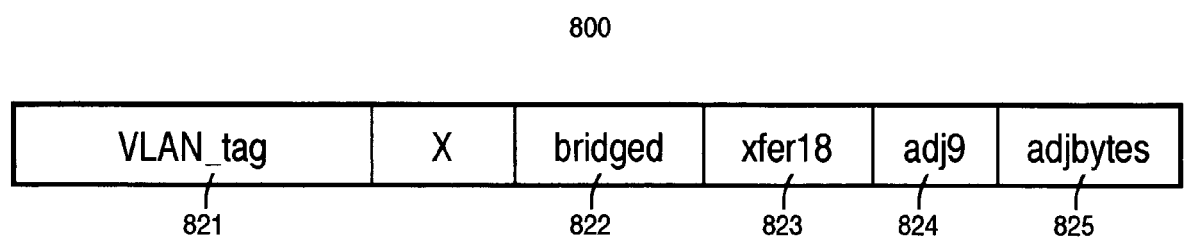
Figure 8C:
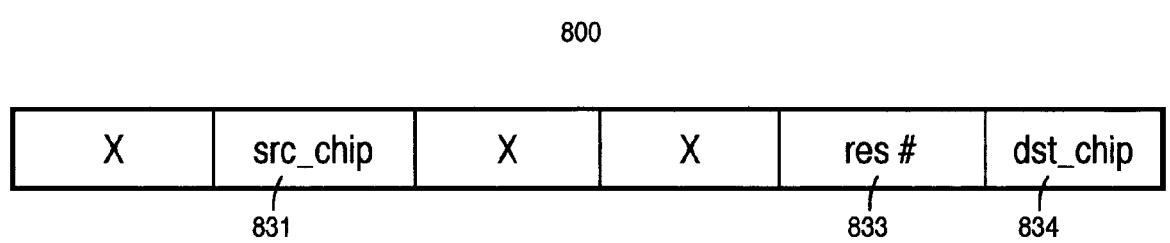

FIGS. 8A–8C collectively illustrate an exemplary send command 800 that may be used to move a packet. When a send command 800 is received, all data transfers that follow may be considered to be part of that packet. The values for the hdr_type field 811 may be seen in the type table 900 of FIG. 9, which is a table of exemplary header meanings.

Continuing with the discussion of the exemplary send command 800 and referring now to FIG. 8B, the VLAN_tag field 821 may specify the entire VLAN tag (e.g., 16 bits). The bridged field 822 may indicate the packet is being bridged. The xfer18 field 823 may indicate the number of 18 byte block transfers required for this packet. The adj9 field 824 may be an adjustment for 9-byte domain. The adjbytes field 825 may be for an adjustment to obtain the actual packet size.

Continuing with the discussion of the exemplary send command 800 and referring now to FIG. 8C, the src_chip field 831 may specify the fabric driver 140 that the packet is coming from. The res# field 833 may hold the reservation number that was returned by the buffer reply command 190. The dst_chip field 834 may specify the fabric receiver 160 that is to receive the packet.

Embodiments of the present invention may be operable in a layer 1 or layer 2 device for forwarding packets, such as, for example, a switch, hub, bridge or the like. However, the present invention is not limited to these devices and embodiments may be applicable to devices that forward packets at other layers, such as, for example layer 3 devices such as routers.

While the present invention has been described in particular embodiments, it should be appreciated that the present invention should not be construed as limited by such embodiments, but rather construed according to the below claims.

We claim:

1. A system for forwarding packets, comprising:
   a first node for creating requests having a plurality of filters for specifying packet forwarding criteria and for specifying values for said filters based on a packet to be forwarded; and
   a second node coupled to said first node and to a plurality of ports, wherein said second node comprises at least one table having information for specifying which of said ports are to receive said packet based on said filter values, and wherein said second node determines which ports are to receive said packet based on said table information and said filter values, wherein said second node is further for determining whether there is sufficient memory for a packet on a port and for reserving said memory, if so.

2. The system of claim 1, wherein said second node is further for sending a reply selected between the group consisting of: indicating to send said packet if at least one port is ready to receive said packet, indicating to send said packet if all ports that are to receive said packet are ready to receive said packet, indicating to wait a period of time before retrying said request if no port is ready to receive said packet, indicating to wait a period of time before retrying said request if at least one port that is to receive said packet is not ready to receive said packet, and indicating to drop said packet if no port is to receive said packet.

3. The system of claim 1, further comprising a third node coupled to said first node and to a plurality of ports and comprising at least one table comprising port masks and for determining which of said ports coupled to said third node are to receive said packet based on said filter values and information in said at least one table on said third node, said third node having a different number of ports than said second node and wherein said first node does not specify in said request the ports that are to receive the packet coupled to said third node when sending requests to said second node and vice versa.

4. The system of claim 3, wherein said port masks at said second node comprise a bit for each port coupled to said second node and said port masks at said third node comprise a bit for each port coupled to said third node, wherein said port masks comprise a different number of bits for said second and third node.

5. The system of claim 4, wherein said first node is further for creating said requests without factoring in the number of ports at said second node and said third node.

6. The system of claim 1, wherein said system comprises a plurality of nodes having ports and coupled to said first node, said plurality of nodes for determining which of said ports coupled to said plurality of nodes are to receive said packet based on said filter values, and wherein said first node further comprises at least one table having information for specifying which of said plurality of nodes is to receive said packet based on said filter values.

7. The system of claim 1, wherein said first node is further for creating said requests without specifying which port at said second node is to receive said packet.

8. A method of forwarding transmissions, comprising:
   a) a first node creating a request having a plurality of filters for specifying forwarding criteria for a transmission;
   b) said first node sending said request to a second node;
   c) said second node determining which ports, if any, coupled to said second node are to receive said transmission by mapping said filters to information for specifying which ports are to receive said transmission based on said criteria; and
   d) forwarding said transmission to said port, if any, wherein a) comprises said first node setting an index in at least one of said plurality of filters to specify at least a portion of said forwarding criteria.

9. The method of claim 8, wherein a) further comprises:
   a1) said first node examining an incoming transmission to determine said index.

10. The method of claim 8, wherein c) comprises said second node indexing at least one table comprising said information with said index.

11. The method of forwarding transmissions of claim 8, wherein a) comprises said first node setting indexes in more than one of said plurality of filters to specify said forwarding criteria.

12. The method of claim 11, wherein c) comprises:
   c1) said second node indexing at least one table comprising said information with said indexes to determine a plurality of bit masks that define ports that are to receive said transmission for criteria associated with respective filters; and
   c2) performing a logical AND between said plurality of bit masks to determine the port or ports that are to receive said transmission.

13. The method of claim 11, wherein said plurality of filters specify forwarding criteria based on information selected from the group consisting of: virtual local area network membership, transmission source port, trunk balancing, multicasting, unicasting, and protocols supported.

14. The method of claim 8, wherein c) further comprises:
   c1) said second node determining whether an output buffer has sufficient memory for said transmission to be sent on a first port of said plurality of ports; and
   c2) reserving space in said buffer if there is sufficient space.

15. The method of claim 8, further comprising:
before forwarding said transmission, said second node sending a reply to said first node, said reply indicating a response selected between the group consisting of: indicating to send said transmission if buffer space is reserved in e), indicating to wait a period of time before retrying said request if no buffer space is reserved in e), and indicating to drop said transmission if no port is to receive said transmission.

16. The method of claim 8, further comprising:
before forwarding said transmission, said second node sending a reply to said first node, said reply indicating a response selected between the group consisting of: indicating to send said transmission if at least one port is ready to receive said transmission, indicating to send said transmission if all ports that are to receive said transmission are ready to receive said transmission, indicating to wait a period of time before retrying said request if no port is ready to receive said transmission, indicating to wait a period of time before retrying said request if at least one port that is to receive said transmission is not ready to receive said transmission, and indicating to drop said transmission if no port is to receive said transmission.

17. A system for forwarding packets comprising a first and a second processor and at least one computer readable medium having stored thereon instructions, which when executed on said processors implement a method of forwarding packets, said method comprising:
   a) said first processor creating a request having a plurality of filters for specifying forwarding criteria for a packet;
   b) said first processor setting indexes in said plurality of filters to specify said forwarding criteria;
   c) sending said request from said first processor to said second processor;
   d) said second processor determining which ports, if any, coupled to said second processor are to receive said packet by:
      d1) indexing a plurality of tables defining which ports are to receive said packet based on said criteria to determine a plurality of port masks;
      d2) combining said port masks to determine which ports, if any, are to receive said packet; and
   e) forwarding said packet to said ports, if any.

18. The system of claim 17, wherein b) of said method further comprises:
   b1) said first processor examining an incoming packet to determine said indexes.

19. The system of claim 17, wherein d) of said method further comprises:
   d3) said second processor determining whether an output buffer has sufficient memory for said packet to be sent on a first port of said plurality of ports; and
   d4) reserving space in said buffer if there is sufficient space.

20. The system of claim 17, wherein d) of said method further comprises:
   d3) said second processor determining whether output buffers associated with a plurality of ports that are to receive said packet based on d2) have sufficient memory for said packet to be sent; and d4) reserving space in said buffers that have sufficient space, if any.

21. The system of claim 17, wherein d2) of said method comprises performing a logical AND of said plurality of port masks.

22. A method of forwarding transmissions, comprising:
a) a first node creating a request having a plurality of filters for specifying forwarding criteria for a transmission;
b) said first node indexing at least one table with said filters to determine which of a plurality of nodes having ports coupled thereto are to receive said request, if any;
c) said first node sending said request to said nodes determined in b) if any;
d) said nodes, if any, receiving said request and determining which ports, if any, coupled to respective of said nodes are to receive said transmission by mapping said filters to information for specifying which ports are to receive said transmission based on said criteria; and
e) forwarding said transmission to said ports, if any.

23. The method of claim 22, wherein b) comprises performing a logical AND of the results of indexing said at least one table.

24. The method of claim 22, wherein said first node is implemented as an application specific integrated circuit (ASIC).

25. The method of claim 22, wherein said plurality of nodes are implemented as application specific integrated circuits (ASICs).

* * * * *

UNITED STATES PATENT AND TRADEMARK OFFICE
CERTIFICATE OF CORRECTION

PATENT NO. : 7,103,045 B2  Page 1 of 1
APPLICATION NO. : 10/091691
DATED : September 5, 2006
INVENTOR(S) : Bruce E. Lavigne et al.

It is certified that error appears in the above-identified patent and that said Letters Patent is hereby corrected as shown below:

In column 5, line 63, insert -- step -- before "360".

In column 7, line 26, delete "TrunklUnicast/Flood" and insert -- Trunk/Unicast/Flood --, therefor.

Signed and Sealed this

Sixteenth Day of February, 2010

David J. Kappos
*Director of the United States Patent and Trademark Office*